United States Patent [19]

Kasaoka

[11] 4,043,939
[45] Aug. 23, 1977

[54] REACTIVATION OF CATALYSTS USEFUL FOR NITROGEN OXIDE REMOVAL

[75] Inventor: Shigeaki Kasaoka, Okayama, Japan

[73] Assignee: Kurashiki Boseki Kabushiki Kaisha, Kurashiki, Japan

[21] Appl. No.: 621,434

[22] Filed: Oct. 10, 1975

[51] Int. Cl.² .................. B01J 23/94; B01J 23/96; B01J 23/92; B01J 21/20

[52] U.S. Cl. ..................... 252/416; 252/411 S; 423/239

[58] Field of Search ............. 252/411 S, 411 R, 416; 423/239, 244

[56] References Cited

U.S. PATENT DOCUMENTS

| | | | |
|---|---|---|---|
| 2,747,968 | 5/1956 | Pigache | 423/244 |
| 3,449,063 | 6/1969 | Griffing et al. | 423/213 |
| 3,864,451 | 2/1975 | Lee et al. | 423/239 |
| 3,914,390 | 10/1975 | Kudo et al. | 423/239 |

OTHER PUBLICATIONS

*The Catalytic Chemistry of Nitrogen Oxides*, R. L. Klimisch et al., Plenum Press, N.Y., 1975, pp. 133-147.
Derwent-Publications Ltd., 1949 v/11, De-804-317, Esso Research & Eng. Co., 2/28/74, 801d.

*Primary Examiner*—Patrick P. Garvin
*Assistant Examiner*—P. E. Konopka
*Attorney, Agent, or Firm*—Jones, Tullar & Cooper

[57] ABSTRACT

Catalysts inactivated in the course of removing nitrogen oxides in the presence of ammonia by poisons present in exhaust gas can be reactivated for repeated reuses by calcination in the atmosphere at an elevated temperature, e.g., from about 700° C to 1,200° C.

4 Claims, No Drawings

REACTIVATION OF CATALYSTS USEFUL FOR NITROGEN OXIDE REMOVAL

The present invention relates to the reactivation of a catalyst useful for removal of nitrogen oxides in exhaust gas. More particularly, it relates to a method of reactivating a catalyst for the removal of nitrogen oxides, said catalyst being inactivated by the presence of materials in the course of operations for removing nitrogen oxides from exhaust gas. This method of reactivation is very advantageous because it is adapted to continuously eliminate nitrogen oxides and dust present in the exhaust gas.

Removal of nitrogen oxides using large-scale processing apparatus from a fixed source of combustion is now reaching the stage of long-term evaluation. Various procedures for the dry nitrogen oxides removal system have been proposed; among them, the selective catalytic reduction of nitrogen oxides is of the greatest promise. A variety of catalysts useful for this purpose have been proposed. However, it is well known that those catalysts, when used for the removal of nitrogen oxides from combustion furnace gases such as boiler gas produced by the combustion of, for example, heavy oil, cannot achieve the expected effects because they are "poisoned" or inactivated by the presence of small amounts of "poisons" present in such gases.

For this purpose, it is disclosed in Japanese Patent Application No. 97,409/1973 to employ a reducing gas such as hydrogen, carbon monoxide, or a hydrocarbon, e.g., methane, ethane, propane, butane, hexane or decane, or a mixture thereof or such a reducing gas diluted with steam. There has still been a great demand to develop an improved method of reactivation of catalysts.

It is therefore the primary object of the present invention to provide a method of the reactivation of a catalyst useful for removal of nitrogen oxides in exhaust gas.

Another object of the present invention is to provide a method of reactivating a catalyst poisoned in the course of removal of nitrogen oxides from exhaust gas.

Other objects, features and advantages of the present invention will become more apparent with reference to the following description of the specification and the appended claims.

As the result of extensive studies, it has been found that a catalyst which was inactivated by poisons during the course of the removal of nitrogen oxides such as nitrogen monoxide, nitrogen dioxide or so forth can be reactivated by calcinating such a poisoned catalyst at a temperature in the range of from about 700° to 1200° C. in the atmosphere, thereby allowing the reactivated catalyst to be re-used for the removal of nitrogen oxides present in exhaust gas.

The reactivation of a catalyst according to the present invention is carried out by calcinating a catalyst which was poisoned by the presence of poisons, particularly sulfurous materials such as sulfur dioxide or sulfur trioxide present in combustion furnace gas, at elevated temperatures in the atmosphere. The calcination may be carried out in conventional manner, e.g., by means of an electric furnace. The temperature at which an inactivated catalyst is calcined for reactivation according to the present invention is in a range sufficient to disallow gamma-alumina to be converted into alpha-alumina and particularly in the range of from about 700° to 1200° C., preferably from about 700° to 1,000° C. and more preferably from about 800° to 900° C.

The method according to the present invention is applicable particularly to catalysts which were used for reductively decomposing nitrogen oxides present in combustion furnace gas in the presence of ammonia and inactivated or poisoned particularly by the presence of the sulfur oxides therein. Such catalysts include, for example, any catalyst containing copper, iron, cobalt, chromium, nickel, manganese, titanium, vanadium, molybdenum, silver, platinum, rhodium or palladium or a mixture thereof as the catalyst component. The catalysts used herein are ones supported on a carrier or a material equivalent thereto, such as a variety of oxides including a mono-, di- or poly-component system, particularly any carrier consisting essentially of alumina or containing alumina. Examples of such carriers are, for example, alumina, silica-alumina, magnesia-alumina, titania-alumina, calcium oxide-alumina, chromium oxide-alumina or silica-chromium oxide-alumina. These catalysts may be prepared in conventional manner: for example, by the precipitation method using a precipitating agent such as sodium carbonate, sodium hydroxide, ammonium hydroxide, ammonium sulfide or sodium sulfide; by the support-immersion method; by the thermal decomposition method; and by the admixture method; and a mixture thereof.

With the method according to the present invention, the inactivated catalyst can be reactivated to a level sufficiently as active to act on nitrogen oxides as the fresh catalyst. This method can also function to reduce the increased bulk density of the poisoned catalyst to its original value.

The following examples illustrate the present invention without, however, limiting the same thereto.

REFERENCE EXAMPLE

Gamma-alumina having an average particle size of 1 mm. was calcined for 3 hours at 900° C. and then immersed in an aqueous 15 weight percent solution of copper sulfate pentahydrate for 24 hours. The gamma-alumina thus treated was washed with water, dried and calcined for 5 hours at 550° C.

The copper-sulfate catalyst supported on gamma-alumina and the calcined gamma-alumina were used separately to determine their increase in percent weight. For this purpose, a gas mixture comprising 1,000 p.p.m. of sulfur dioxide and 5 volume percent of oxygen with respect to $N_2$ as the balance was used to pass through said catalyst while raising the reaction temperature from 300° C. to 550° C. by 2° C. per minute. When the temperature reached 550° C., the catalyst was determined with respect to a weight increase. It was found that the weight increased by 2 percent.

With a gas mixture containing 2 volume percent of sulfur dioxide and 10 volume percent of oxygen with respect to $N_2$ as the balance, the catalyst and said carrier itself were separately treated in the same manner as above. It was found that the catalyst increased its weight by 6 percent and the carrier by 1 percent.

These results indicate that the copper-sulfate catalyst supported on the alumina carrier has a greater catalytic activity for oxidation of sulfur dioxide to sulfur trioxide than the alumina carrier alone. It is also said that the rate of sulfatization of the former is faster than the other. The rate of sulfatization naturally becomes greater with an increase in the concentration of sulfur dioxide.

EXAMPLE 1

A. Preparation of Catalyst

Gamma-alumina carrier having an average particle size of 4 mm. was immersed in a 15 weight percent aqueous solution of copper sulfate pentahydrate for 24 hours. The carrier was washed with water, dried and then calcined for 2 hours at 900° C.

B. Removal of Nitrogen Oxides

A gas mixture containing 300 p.p.m. of nitrogen oxide, 1,200 p.p.m. of sulfur dioxide, 5 volume percent of oxygen, 10 volume percent of carbon dioxide and 10 volume percent of steam with respect to $N_2$ as the balance was passed through 2 grams of said catalyst at a flow velocity of 500 Nml. per minute and the reaction temperature of 400° C. in the presence of 400 p.p.m. of ammonia. Determination with respect to percent denitrogenation and percent weight increase were made at the initial stage and at predetermined intervals. The results are shown in Table 1.

Table 1

| Period of Time | Denitrogenation (%) | Weight Increase (%) |
|---|---|---|
| 0 | 96 | 0 |
| 200 | 93 | 23 |
| 300 | 86 | 35 |
| 400 | 65 | 55 |

C. Reactivation of Catalyst

The catalyst which had been employed for a period of 400 hours were then calcined for 2 hours at 800° C. in an electric furnace. The reactivated catalyst was then treated in the same manner as above and found to give a 97 percent denitrogenation. The bulk density of the catalyst was also found to return to the initial value.

EXAMPLE 2

The gas mixture employed in Example 1(B) was passed through 10 grams of the catalyst prepared in Example 1(A) under the same conditions as in Example 1(B). After a period of 400 hours, the catalyst was taken out of the system and divided into 5 equivalent amounts. Each of the catalyst group was then calcined separately for one hour at 400° C., 600° C., 700° C., 800° C. and 900° C., respectively. The catalyst was then treated in the same manner as in Example 1(B) to determine their catalytic activity. The results are set out in Table 2.

Table 2

| Temperature of Calcination | Denitrogenation (%) |
|---|---|
| 400 | 66 |
| 600 | 65 |
| 700 | 90 |
| 800 | 97 |
| 900 | 96 |

Table 2 indicates that the inactivated catalyst was reactivated remarkably when it was calcined at temperatures higher than 700° C.

EXAMPLE 3

A gas mixture containing 2 volume percent of sulfur dioxide, 20 volume percent of oxygen and 10 volume percent of steam was passed through the catalyst prepared in Example 1(A) at a flow velocity of 500 Nml. per minute and a temperature of 400° C. for a period of 168 hours. The percent denitrogenation of the catalyst at that time was down to 10 percent. The catalyst increased its weight by 80 percent.

The catalyst was then calcined for 2 hours at 900° C. in an electric furnace. The catalyst thus treated was found to recover its activity and return to the initial weight.

The catalyst was then treated in the same manner as above for reactivation. This procedure was repeated ten times, but each time it was found that the catalyst was reactivated to the initial value with respect to its catalytic activity.

What is claimed is:

1. A method of regenerating a catalyst which removes nitrogen oxides from exhaust gas in the presence of ammonia, which catalyst comprises copper, iron, cobalt, chromium, nickel, manganese, titanium, vanadium, molybedenum, silver, platinum, rhodium or palladium supported on an alumina, silica-alumina, magnesia-alumina, titania-alumina, calcium oxide alumina, chromium oxide-alumina, or chromium oxide alumina carrier, which catalyst has been employed to remove nitrogen oxides from exhaust gas in the presence of ammonia, and which is inactivated by the presence of sulfur oxides in the exhaust gas which method comprises calcining said catalyst in substantially the atmosphere at a temperature in the range of from about 700° to 1200° C thereby restoring the initial nitrogen oxide removing activity of said catalyst.

2. A method, in in claim 1, wherein the temperature is in the range of about 800° to 900° C.

3. A method, as in claim 1, of regenerating a catalyst comprising copper.

4. A method, as in claim 3, wherein the temperature is in the range of about 800° to 900° C.

* * * * *